United States Patent
Takahashi et al.

(10) Patent No.: US 11,174,820 B2
(45) Date of Patent: Nov. 16, 2021

(54) CANISTER

(71) Applicant: AISAN KOGYO KABUSHIKI KAISHA, Obu (JP)

(72) Inventors: Hiroyuki Takahashi, Nagoya (JP); Yoshihiko Honda, Obu (JP); Shota Tsukamoto, Kariya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/681,906

(22) Filed: Nov. 13, 2019

(65) Prior Publication Data

US 2020/0166009 A1 May 28, 2020

(30) Foreign Application Priority Data

Nov. 26, 2018 (JP) .............................. JP2018-220314

(51) Int. Cl.
*F02M 25/08* (2006.01)
*B60K 15/03* (2006.01)

(52) U.S. Cl.
CPC .... *F02M 25/0854* (2013.01); *F02M 25/0818* (2013.01); *F02M 25/0872* (2013.01); *B01D 2253/102* (2013.01); *B60K 2015/03236* (2013.01); *F02M 2025/0881* (2013.01)

(58) Field of Classification Search
CPC ................................................. F02M 25/0881
See application file for complete search history.

(56) References Cited

U.S. PATENT DOCUMENTS

| | | | | |
|---|---|---|---|---|
| 6,343,591 B1* | 2/2002 | Hara | ................. | B01D 46/0036 123/519 |
| 6,695,895 B2* | 2/2004 | Hyodo | ................. | F02M 25/089 123/519 |
| 7,036,359 B2* | 5/2006 | Hayakawa | ......... | F02M 25/0809 73/114.39 |
| 7,228,851 B2* | 6/2007 | Nakamura | ......... | F02M 25/0836 123/198 D |
| 7,363,803 B2* | 4/2008 | Hayakawa | ......... | F02M 25/0809 123/499 |
| 9,074,561 B2* | 7/2015 | Makino | ............... | F02M 25/0854 |
| 9,863,376 B2* | 1/2018 | Aso | .................... | F02M 37/0082 |
| 10,851,746 B2* | 12/2020 | Kim | .................... | F02M 37/007 |
| 2002/0162457 A1* | 11/2002 | Hyodo | ............... | B01D 53/0454 96/109 |
| 2005/0022588 A1* | 2/2005 | Hayakawa | ......... | F02M 25/0809 73/114.41 |
| 2006/0191330 A1* | 8/2006 | Hayakawa | ......... | F02M 25/0809 73/114.39 |
| 2006/0278201 A1* | 12/2006 | Nakamura | ......... | F02M 25/0818 123/519 |

(Continued)

FOREIGN PATENT DOCUMENTS

| | | |
|---|---|---|
| JP | 2016-169740 A | 9/2016 |
| JP | 2017-040177 A | 2/2017 |
| JP | 2017-210904 A | 11/2017 |

*Primary Examiner* — Kevin R Steckbauer
(74) *Attorney, Agent, or Firm* — Oliff PLC

(57) ABSTRACT

A canister includes a plurality of activated carbon layers for adsorbing vaporized fuel and a purge pump for introducing purge air into the canister to cause purge gas containing the vaporized fuel to flow out of the canister. At least a part of the purge pump is placed in the chamber defined between the activated carbon layers.

6 Claims, 10 Drawing Sheets

(56) References Cited

U.S. PATENT DOCUMENTS

| | | | |
|---|---|---|---|
| 2007/0012298 A1* | 1/2007 | Nakamura | F02M 25/0836 |
| | | | 123/509 |
| 2012/0260893 A1* | 10/2012 | Makino | F02M 25/0854 |
| | | | 123/520 |
| 2013/0061934 A1* | 3/2013 | Kambakhsh | F02M 37/14 |
| | | | 137/1 |
| 2017/0051705 A1* | 2/2017 | Aso | B60K 15/035 |
| 2019/0383250 A1* | 12/2019 | Kim | B01D 46/0002 |
| 2020/0018247 A1* | 1/2020 | Shinagawa | F02M 25/0854 |
| 2020/0198460 A1* | 6/2020 | Honda | B01D 53/0438 |

* cited by examiner

FIG. 10
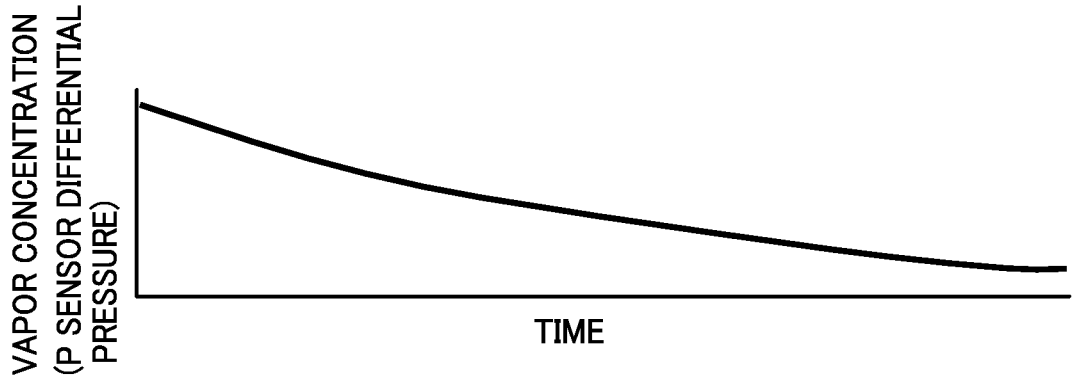
FIG. 11
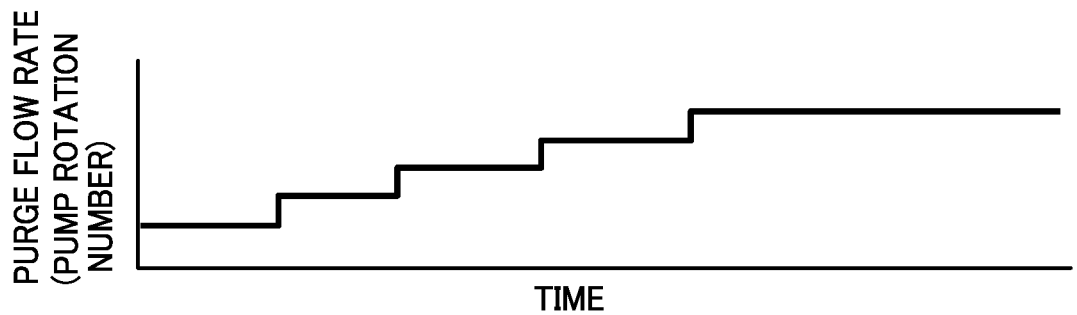
FIG. 12
| VAPOR CONCENTRATION | PURGE FLOW RATE | PURPOSE |
|---|---|---|
| HIGH CONCENTRATION | SMALL FLOW RATE | TO PREVENT EXCESSIVE COOLING DUE TO DESORPTION TO ENHANCE DESORPTION EFFICIENCY |
| LOW CONCENTRATION | LARGE FLOW RATE | TO ENSURE DESORPTION AMOUNT BY LARGE FLOW RATE |

CANISTER

CROSS-REFERENCE TO RELATED APPLICATIONS

This application is based upon and claims the benefit of priority from the prior Japanese Patent Application No. 2018-220314 filed on Nov. 26, 2018, the entire contents of which are incorporated herein by reference.

BACKGROUND

Technical Field

The present disclosure relates to a canister to be used for a vaporized fuel treating apparatus for an internal combustion chamber which will be mounted in a vehicle of a car or the like.

Related Art

As a conventional art, Japanese unexamined patent application publication No. 2017-210904 (JP 2017-210904A) discloses an art that a pump is placed in contact with activated carbon (an adsorbent) in a canister, so that the activated carbon is heated or warmed by the heat generated from the pump driven during execution of a purge treatment, thereby promoting desorption of vaporized fuel from the activated carbon.

SUMMARY

Technical Problems

In the art disclosed in JP 2017-210904A, the activated carbon located in contact with or near the pump could be heated by the pump during driving; however, other portions of the activated carbon located apart from the pump could not be heated by the heat generated by the pump during driving. This configuration is less likely to sufficiently heat the entire activated carbon and hence may not prompt desorption of vaporized fuel from the activated carbon. Further, the pump could not be sufficiently cooled by vaporization heat that is generated when the vaporized fuel is desorbed from the activated carbon. Thus, the cooling efficiency of the pump may deteriorate.

The present disclosure has been made to address the above problems and has a purpose to provide a canister capable of promoting or expediting desorption of vaporized fuel from an adsorbent and enhancing the cooling efficiency of a purge pump.

Means of Solving the Problems

To achieve the above-mentioned purpose, one aspect of the present disclosure provides a canister comprising: a plurality of adsorbents for adsorbing vaporized fuel; and a purge pump configured to introduce atmospheric air into the canister and cause a purge gas containing the vaporized fuel to flow out of the canister, wherein at least a part of the purge pump is placed in a chamber defined between the adsorbents.

According to the above configuration, when a purge treatment is performed by driving the purge pump, the purge gas or atmospheric air exchanges heat with the purge pump while flowing through the chamber. Thus, the purge gas or atmospheric air flowing through the chamber is heated by the heat generated by the purge pump, whereas the purge pump is cooled by the purge gas or atmospheric air flowing through the chamber. Accordingly, desorption of vaporized fuel from the adsorbent can be promoted and the cooling efficiency of the purge pump can be enhanced.

Advantageous Effects

The canister according to the present disclosure can promote desorption of vaporized fuel from the adsorbent and enhance the cooling efficiency of the purge pump during execution of a purge treatment.

BRIEF DESCRIPTION OF THE DRAWINGS

FIG. 10 is a graph showing one example of changes in vapor concentration with time in Example 4 of the second embodiment;

FIG. 11 is a graph showing changes in purge flow rate with time according to the vapor concentration in Example 4 of the second embodiment; and FIG. 12 is a table showing an example of control of the purge flow rate according to the vapor concentration in Example 4 of the second embodiment.

DETAILED DESCRIPTION OF THE EXEMPLARY EMBODIMENTS

A detailed description of embodiments of a canister typically embodying the present disclosure will now be given referring to the accompanying drawings. In vehicles such as cars, a vaporized fuel treating apparatus is mounted for treatment to supply vaporized fuel generated in a fuel tank to an internal combustion engine. This vaporized fuel treating apparatus includes a canister configured to store the vaporized fuel which flows therein from the fuel tank. Thus, the embodiments of the canister according to the present disclosure will be described below.

First Embodiment

A canister 1 in a first embodiment will be first described.

Configuration of Canister

Figure 1:
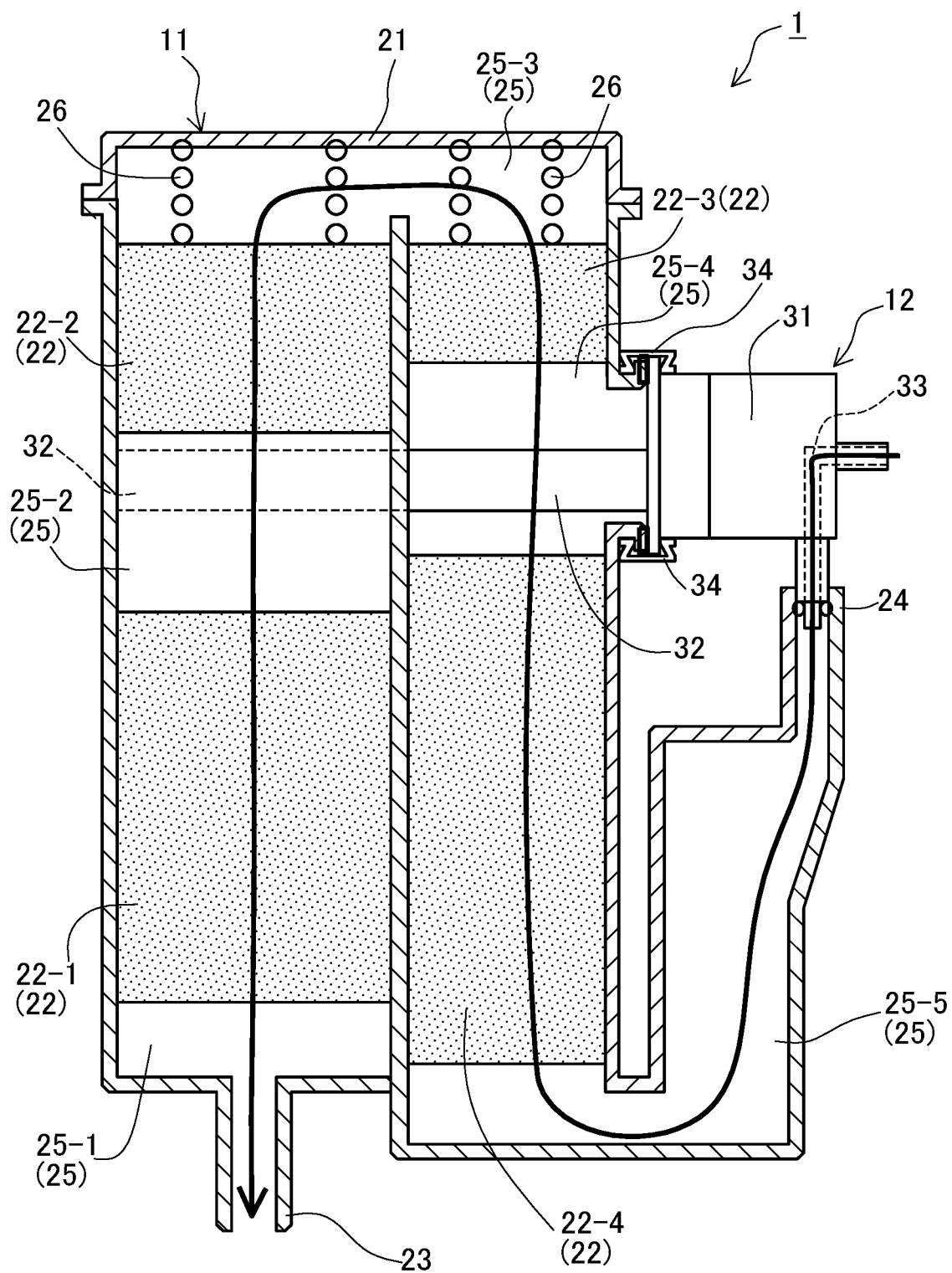
FIG. 1 is a cross-sectional view of a canister with a purge pump shown in an external view in a first embodiment.

As shown in FIG. 1, the canister 1 includes a canister body 11 and a purge pump 12.

The canister body 11 is provided with a canister case 21 and activated carbon 22 as shown in FIG. 1.

The canister case 21 is a container for storing vaporized fuel which flows therein from a fuel tank (not shown) via a vapor passage (not shown). This canister case 21 includes a purge port 23 and an atmosphere port 24. The purge port 23 is an outlet port through which purge gas, i.e., the gas that contains purge air (i.e., atmospheric air) and vaporized fuel, flows from inside to outside of the canister case 21. The atmosphere port 24 is an intake port through which the purge air is introduced into the canister case 21 from atmospheric space, or atmosphere. This atmosphere port 24 is one example of an air intake port of the present disclosure.

The activated carbon 22 is an adsorbent capable of removably adsorbing vaporized fuel generated in the fuel tank (not shown) and is accommodated in the canister case 21. Herein, as one example, the activated carbon 22 is provided in four places in the canister case 21. The activated carbon 22 in four places forms four layers arranged from a position near the purge port 23 toward the atmosphere port 24 in the order of a first layer of activated carbon ("first-layer activated carbon") 22-1 (a first adsorbent), a second layer of activated carbon ("second-layer activated carbon") 22-2 (a second adsorbent), a third layer of activated carbon ("third-layer activated carbon") 22-3 (a third adsorbent), and a fourth layer of activated carbon ("fourth-layer activated carbon") 22-4 (a fourth adsorbent). The activated carbon 22 is one example of an adsorbent of the present disclosure.

Furthermore, in the canister case 21, there are provided five chambers 25; namely, a first chamber 25-1, a second chamber 25-2, a third chamber 25-3, a fourth chamber 25-4, and a fifth chamber 25-5.

The first chamber 25-1 is located between the purge port 23 and the first-layer activated carbon 22-1. The second chamber 25-2 is located between the first-layer activated carbon 22-1 and the second-layer activated carbon 22-2. The third chamber 25-3 is located between the second-layer activated carbon 22-2 and the third-layer activated carbon 22-3. The fourth chamber 25-4 is located between the third-layer activated carbon 22-3 and the fourth-layer activated carbon 22-4. The fifth chamber 25-5 is located between the fourth-layer activated carbon 22-4 and the atmosphere port 24.

The activated carbon 22 is supported by springs 26, support members not shown, and others. Further, a urethane member (not shown) is placed between each layer of activated carbon 22 and each corresponding support member.

Figure 2:
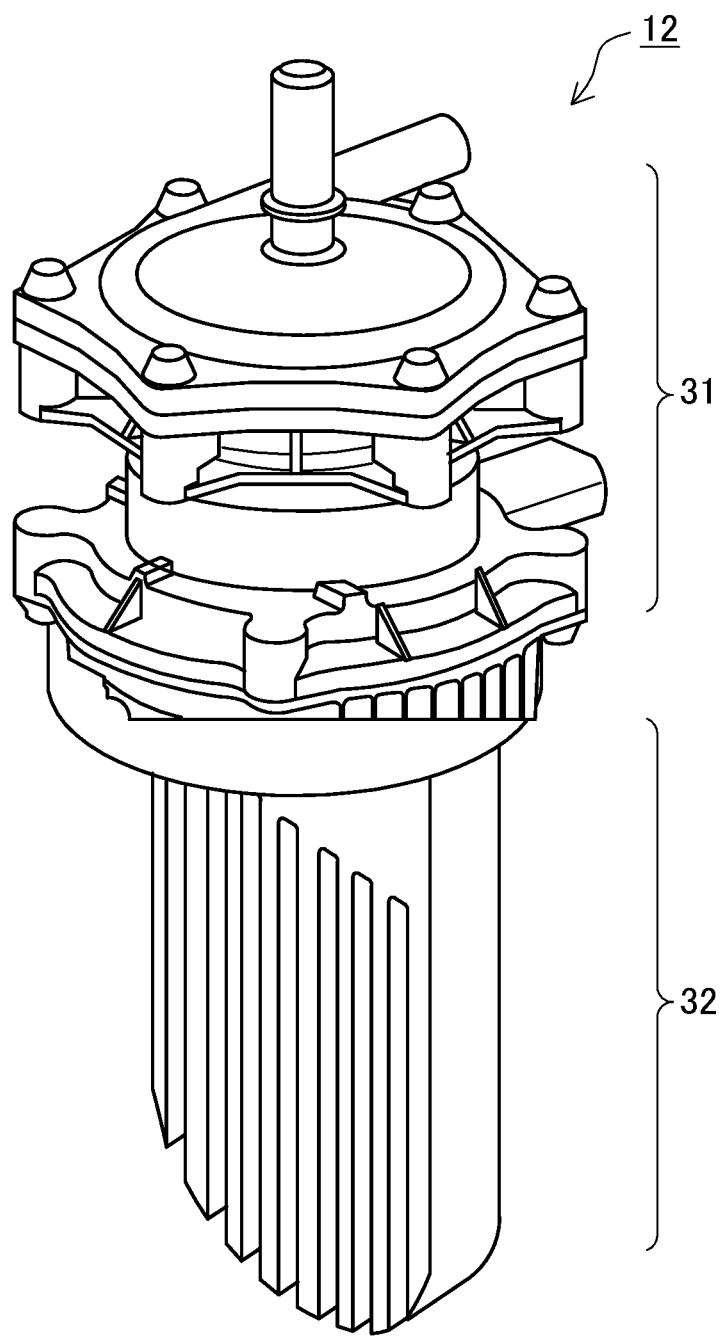
FIG. 2 is an external perspective view of the purge pump provided in the canister in the first embodiment.

The purge pump 12 is a device configured to introduce purge air (atmospheric air) into the canister 1 during execution of the purge treatment and cause a purge gas containing the purge air and the vaporized fuel to flow out of the canister 1. This purge pump 12 is provided with a drive unit 31 and a heatsink 32 as shown in FIGS. 1 and 2.

The drive unit 31 is a mechanical section for driving the purge pump 12 and includes a motor, a bearing, a circuit, and others which are not illustrated. Specifically, the drive unit 31 is a part that generates heat (i.e., a heat generator) from those motor, bearing, circuit, and others during operation of the purge pump 12. In the present embodiment, the drive unit 31 includes an atmosphere passage 33 having one end communicating with the atmosphere and the other end communicating with the atmosphere port 24. The drive unit 31 is one example of a heat generator of the present disclosure. The atmosphere passage 33 is one example of a heat-generator atmosphere passage of the present disclosure.

The heatsink 32 serves as a heat radiator for radiating the heat generated in the drive unit 31 to the outside of the purge pump 12. In the present embodiment, the heatsink 32 is placed in the fourth chamber 25-4 such that the heatsink 32 is positioned with a clearance from each of the third-layer activated carbon 22-3 and the fourth-layer activated carbon 22-4, that is, the heatsink 32 is out of contact with the third-layer activated carbon 22-3 and the fourth-layer activated carbon 22-4. In the present embodiment, accordingly, a part of the purge pump 12 is placed in the fourth chamber 25-4 between the third-layer activated carbon 22-3 and the fourth-layer activated carbon 22-4. This heatsink 32 is one example of a heat radiator of the present disclosure.

Figure 3:
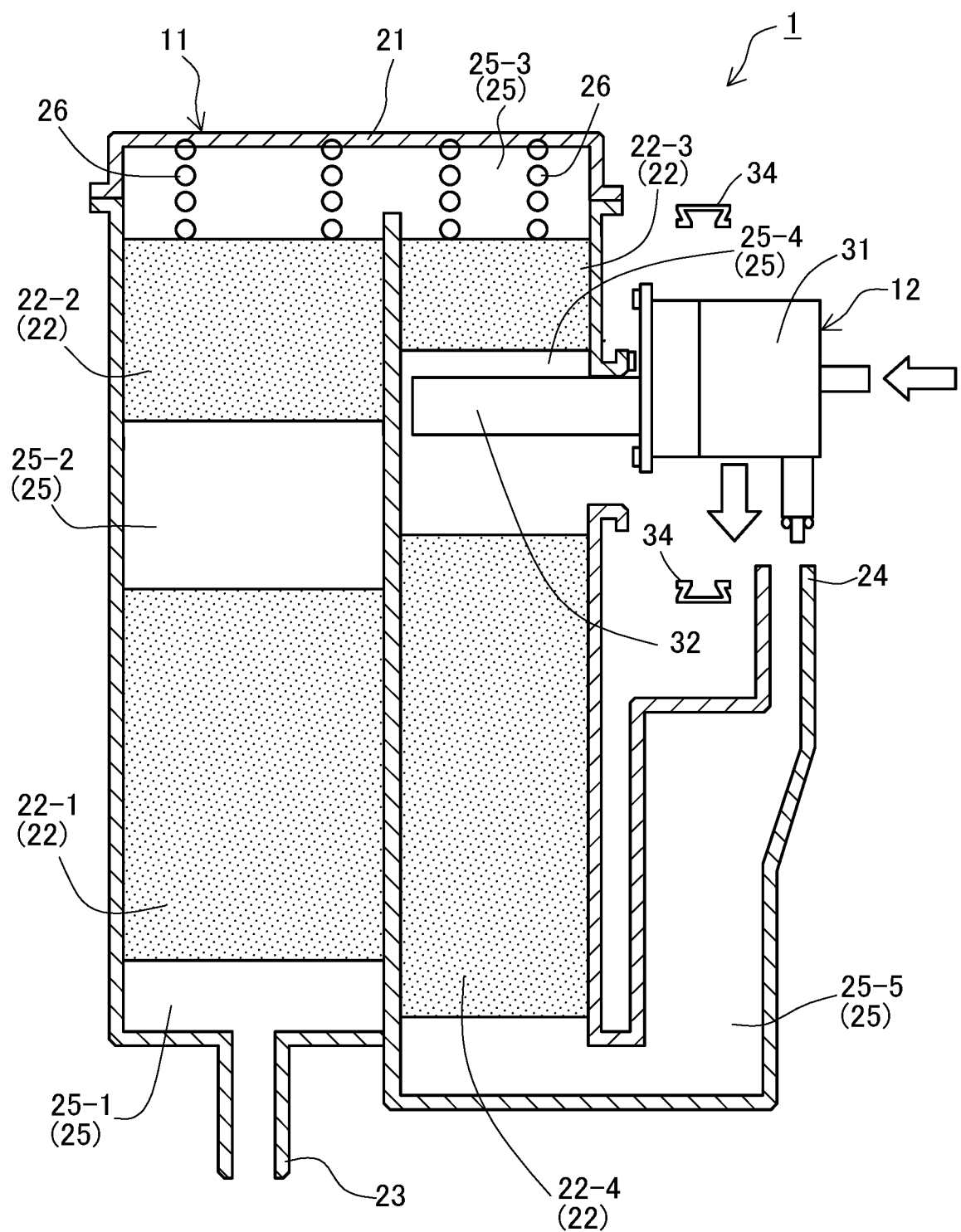
FIG. 3 is a diagram showing how to mount the purge pump in a canister body of the canister in the first embodiment.

As shown in FIG. 3, the purge pump 12 is mounted in the canister 1 in such a way that the heatsink 32 is inserted into the fourth chamber 25-4 and then the purge pump 12 is fixed to the canister body 11 with retainers 34.

Operations of the Canister

In the canister 1 configured as above, the purge treatment is performed when the purge pump 12 is driven. Herein, the purge treatment is a treatment for introducing purge air (atmospheric air) from the atmosphere into the canister 1 and causing a purge gas containing the purge air and the vaporized fuel to flow out of the canister 1.

This purge treatment to be performed in the present embodiment will be described in detail below. In the purge treatment in this embodiment, firstly, the purge air flows from the atmosphere into the fifth chamber 25-5 through the atmosphere passage 33 of the drive unit 31 of the purge pump 12 and the atmosphere port 24 as indicated by an arrow in FIG. 1.

At that time, heat exchange is performed between the drive unit 31 of the purge pump 12 and the purge air flowing through the atmosphere passage 33. Specifically, the purge air flowing through the atmosphere passage 33 is heated or warmed by the heat (radiation heat) from the drive unit 31 of the purge pump 12, more concretely, the heat generated from the motor, bearing, circuit, and others not shown in the drive unit 31 during operation of the purge pump 12. In contrast, the drive unit 31 of the purge pump 12 is cooled by the purge air flowing through the atmosphere passage 33.

When the purge air flowing in the fifth chamber 25-5 further flows in the fourth-layer activated carbon 24-4, the vaporized fuel having adsorbed on the fourth-layer activated carbon 22-4, that is, activated carbon particles or granules constituting the fourth-layer activated carbon 22-4, are caused to desorb therefrom.

At that time, the purge air heated in the atmosphere passage 33 flows in the fourth-layer activated carbon 22-4. Thus, the fourth-layer activated carbon 22-4 is heated by such a heated purge gas, which facilitates desorption of vaporized fuel from the fourth-layer activated carbon 22-4.

Subsequently, the purge gas, i.e., the gas containing the purge air and the vaporized fuel, cooled by desorption of vaporized fuel in the fourth-layer activated carbon 22-4, that is, by the vaporization heat generated by desorption of vaporized fuel, flows from the fourth-layer activated carbon 22-4 to the fourth chamber 25-4.

At that time, in the fourth chamber 25-4, heat exchange is performed between the purge gas and the heatsink 32 of the purge pump 12. In other words, the purge gas is heated by the heat (radiation heat) from the heatsink 32 of the purge pump 12. In contrast, the heatsink 32 of the purge pump 12 is cooled by the purge gas. The drive unit 31 of the purge pump 12 is thus cooled through the heatsink 32.

After that, the purge gas flowing in the fourth chamber 25-4 further flows in the third-layer activated carbon 22-3, causing desorption of vaporized fuel having adsorbed onto the third-layer activated carbon 22-3.

At that time, since the purge gas flowing in the third-layer activated carbon 22-3 has been heated in the fourth chamber 25-4, this heated purge gas heats the third-layer activated carbon 22-3 to prompt desorption of vaporized fuel from the third-layer activated carbon 22-3.

Subsequently, the purge gas flows from the third-layer activated carbon 22-3 to the third chamber 25-3, the second-layer activated carbon 22-2, the second chamber 25-2, the first-layer activated carbon 22-1, and the first chamber 25-1 in turn and then flows out of the canister 1 through the purge port 23. In the present embodiment, the purge treatment is performed as described above.

Operations and Effects of the First Embodiment

In the canister 1 in the present embodiment, as described above, the heatsink 32 of the purge pump 12 is placed in the fourth chamber 25-4.

Accordingly, when the purge pump 12 is driven to perform the purge treatment, the purge gas flowing through the fourth chamber 25-4 exchanges heat with the heatsink 32 of the purge pump 12. Thus, the purge gas cooled in the fourth-layer activated carbon 22-4 by desorption of vaporized fuel therefrom flows in the fourth chamber 25-4 and is heated therein by the heat from the heatsink 32 of the purge pump 12. The thus heated purge gas then flows in the third-layer activated carbon 22-3 and heats the third-layer activated carbon 22-3. This heating prompts desorption of vaporized fuel from the third-layer activated carbon 22-3. Further, the purge gas that has been cooled in the fourth-layer activated carbon 22-4 by desorption of vaporized fuel therefrom and then flows in the fourth chamber 25-4 cools the heatsink 32 of the purge pump 12. Accordingly, the drive unit 31 of the purge pump 12 is cooled through the heatsink 32. This cooling enhances the cooling efficiency of the purge pump 12. Consequently, the canister 1 can prompt the desorption of vaporized fuel from the third-layer activated carbon 22-3 and enhance the cooling efficiency of the purge pump 12.

Since the purge gas is entirely heated in the fourth chamber 25-4, the whole third-layer activated carbon 22-3 is easily heated by the entirely heated purge gas flowing therein. Thus, desorption of vaporized fuel from the third-layer activated carbon 22-3 can be prompted effectively.

The heatsink 32 of the purge pump 12 is placed within the fourth chamber 25-4 so that the heatsink 32 is positioned apart with a clearance from each of the third-layer activated carbon 22-3 and the fourth-layer activated carbon 22-4 without contacting those layers of activated carbon. Thus, the whole heatsink 32 of the purge pump 12 can easily perform uniform heat exchange with the purge gas flowing through the fourth chamber 25-4. This makes it possible to effectively prompt desorption of vaporized fuel from the third-layer activated carbon 22-3 and enhance the cooling efficiency of the purge pump 12.

In the canister 1 in the present embodiment, the drive unit 31 of the purge pump 12 is provided with the atmosphere passage 33 communicating with the atmosphere and the atmosphere port 24.

With the above configuration, when the purge pump 12 is driven to perform the purge treatment, the purge air is introduced from the atmosphere into the canister case 21 through the atmosphere passage 33 and the atmosphere port 24. At that time, heat exchange is performed between the purge air flowing through the atmosphere passage 33 and the drive unit 31 of the purge pump 12. Thus, the purge air flowing through the atmosphere passage 33 is heated by the heat generated from the drive unit 31 of the purge pump 12. The thus heated purge air flows through the fourth-layer activated carbon 22-4, thereby heating this fourth-layer activated carbon 22-4. This heating prompts desorption of vaporized fuel from the fourth-layer activated carbon 22-4. Simultaneously, the drive unit 31 of the purge pump 12 is cooled by the purge air flowing through the atmosphere passage 33. The cooling efficiency of the purge pump 12 is thus enhanced. Consequently, the above heat exchange enables promotion of the desorption of vaporized fuel from the fourth-layer activated carbon 22-4 and enhancement of the cooling efficiency of the purge pump 12.

In the present embodiment, as described above, the vaporized fuel is prompted to desorb from the third-layer activated carbon 22-3 and the fourth-layer activated carbon 22-4, which are located relatively near the atmosphere port 24. Thus, the vaporized fuel is less likely to leak to the atmosphere through the atmosphere port 24. This can enhance Diurnal Breathing Loss (DBL) performance, that is, the performance related to vaporized fuel (HC) discharged from a vehicle to the atmosphere. Further, the amount of vaporized fuel to be adsorbed onto the third-layer activated carbon 22-3 and the fourth-layer activated carbon 22-4 can be reduced. This leads to a reduced size of the third-layer activated carbon 22-3 and the fourth-layer activated carbon 22-4 and hence achieves a downsized canister 1.

In the present embodiment, moreover, the cooling efficiency of the purge pump 12 can be enhanced. This can improve reliability of the purge pump 12 and also enables an increase in the number of rotations of the purge pump 12, with the result that the purge pump 12 can provide improved performance. In addition, electronic components of the circuit part of the drive unit 31 of the purge pump 12 do not need high heat resistance, so that inexpensive electronic components can be adopted with cost reduction.

Second Embodiment

A canister 2 in a second embodiment will be described below, in which the similar or identical parts to those of the canister 1 in the first embodiment are assigned the same reference signs as those in the first embodiment. The following description will be given with a focus on differences from the first embodiment.

EXAMPLE 1

The canister 2 in Example 1 of the second embodiment will be first described.

Configuration of the Canister

Figure 4:
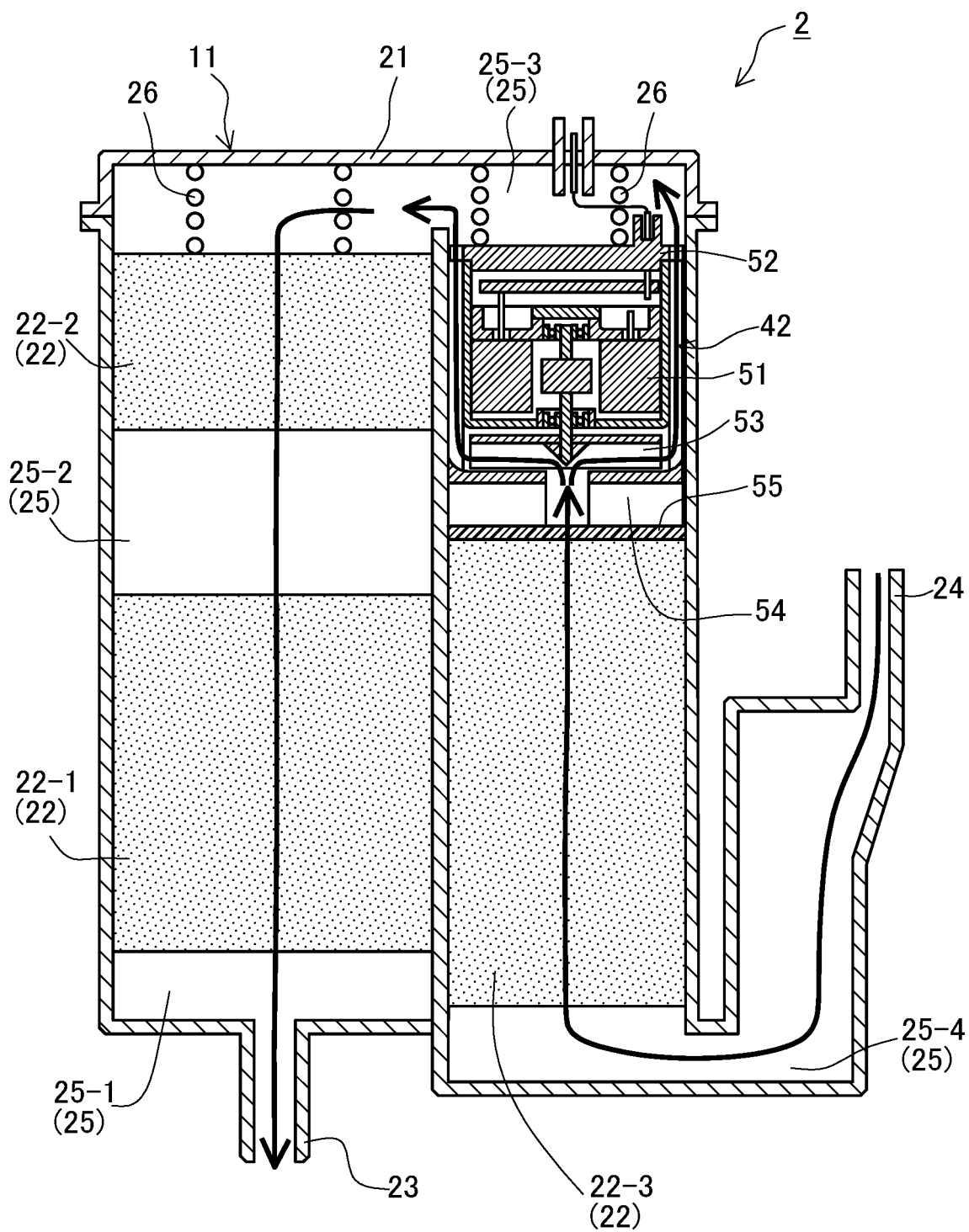
FIG. 4 is a cross-sectional view of a canister in Example 1 of a second embodiment.

The canister 2 in Example 1 is provided with, as one example, the activated carbon 22 in three places in the canister case 21 as shown in FIG. 4. In this canister case 21, four chambers 25 are also defined. The canister 2 is different from the canister 1 in the first embodiment in that the fourth chamber 25-4 in the second embodiment is placed between the third-layer activated carbon 22-3 and the atmosphere port 24.

In Example 1, the canister 2 includes a purge pump 42. This purge pump 42 has a cartridge configuration and is placed in the third chamber 25-3. In this example, accordingly, the whole purge pump 42 is set in the third chamber 25-3 defined between the second-layer activated carbon 22-2 and the third-layer activated carbon 22-3.

The purge pump 42 is mounted in the canister case 21 by press-fit or swaging to secure the sealing performance. This configuration can eliminate the use of a fastening bolt(s) and a sealing member. Since the purge pump 42 is built, or fit, in the canister case 21, no pipe is needed to connect the purge pump 42 and the canister body 11 and hence any connecting process for such a pipe is also unnecessary. This configuration can further cut a process of fixing the purge pump 42 to the canister body 11.

Figure 5:
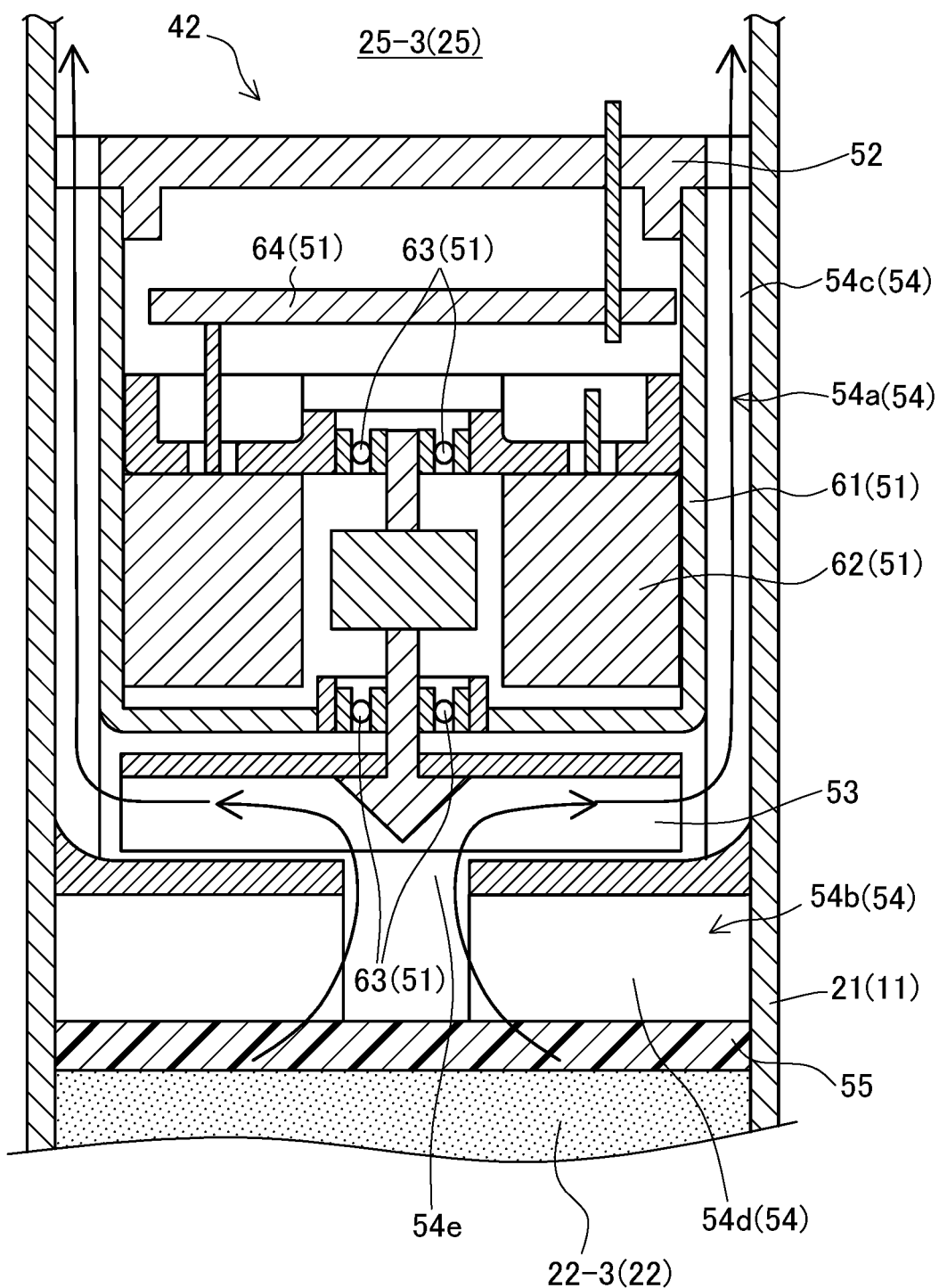
FIG. 5 is a cross-sectional view a purge pump and its surroundings in the canister in Example 1 of the second embodiment.
Figure 6:
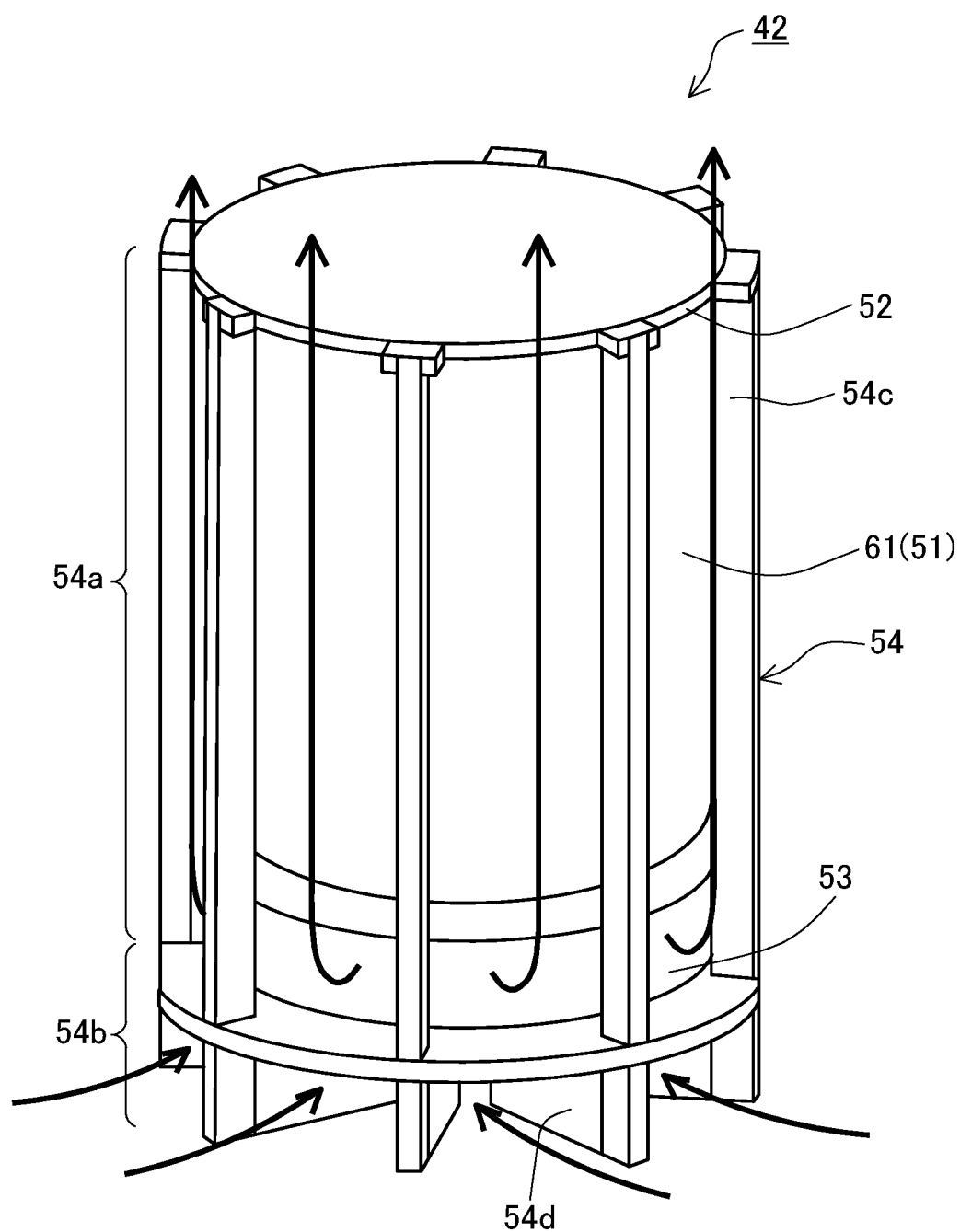
FIG. 6 is an external perspective view of a purge pump in the canister in Example 1 of the second embodiment.

The purge pump 42 is provided with a drive unit 51, a heatsink 52, an impeller 53, and a holder 54 as shown in FIGS. 4 to 6. Furthermore, a urethane member 55 is provided between the holder 54 and the third-layer activated carbon 22-3. This urethane member 55 allows purge gas to pass therethrough.

The drive unit 51 is a mechanical section for driving the purge pump 42 and includes a metal case 61, a motor 62, a bearing 63, a circuit 64, and others. These motor 62, bearing 63, circuit 64, and others are housed in the metal case 61. The drive unit 51 is a part that generates heat (i.e., a heat generator) from those motor 62, bearing 63, circuit 64, and others during operation of the purge pump 42. The drive unit 51 is one example of a heat generator of the present disclosure. In Example 1, the drive unit 51 is placed in the third chamber 25-3.

The heatsink 52 serves as a heat radiator for radiating the heat generated in the drive unit 51 to the outside of the purge pump 42. The heatsink 52 is one example of a heat radiator of the present disclosure.

The impeller 53 is a vane wheel formed in a disk-like shape. This impeller 53 is connected to the motor 62 of the drive unit 51 and is rotated by operation of the motor 62 to agitate purge gas.

The holder 54 includes an upper stage section 54a and a lower stage section 54b. As shown in FIG. 6, the upper stage section 54a is provided with a plurality of ribs 54c spaced apart from each other along the outer circumference of the drive unit 51. The spaces, or clearances, between the circumferentially adjacent ribs 54c allow the purge gas to flow in an axial direction, i.e., along a central axis of the purge pump 42, corresponding to an upward direction in FIG. 6, as indicated by arrows. Furthermore, the lower stage section 54b is provided with a plurality of fins 54d in a radial fashion as shown in FIG. 6 and formed with a hole 54e at the center as shown in FIG. 5. Thus, the purge gas is allowed to flow through the hole 54e and each space between the circumferentially adjacent fins 54d.

Operations of the Canister

In the canister 2 configured as above, the purge treatment is performed when the purge pump 42 is driven.

This purge treatment to be performed in Example 1 will be described below in detail. In the purge treatment in Example 1, firstly, the purge air flows from the atmosphere into the fourth chamber 25-4 through the atmosphere port 24 as indicated by an arrow in FIG. 4. The purge air flowing in the fourth chamber 25-4 then enters the third-layer activated carbon 22-3, causing the vaporized fuel adsorbed on the third-layer activated carbon 22-3 to desorb therefrom.

The purge gas is cooled in the third-layer activated carbon 22-3 by desorption of vaporized fuel therefrom. This cooled purge gas flows from the third-layer activated carbon 22-3 into the third chamber 25-3.

At that time, in the third chamber 25-3, heat exchange is performed between the purge gas and the purge pump 42. Specifically, the purge gas is heated by the heat from the purge pump 42, while the purge pump 42 is cooled by the purge gas.

To be concrete, as indicated by arrows in FIG. 5, the purge gas flows through the hole 54e of the lower stage section 54b of the holder 54 and further is agitated by the impeller 53 to flow through the space defined between the outer peripheral surface of the metal case 61 and the inner surface of the canister case 21. Herein, the space defined between the metal case 61 and the canister case 21 corresponds to the clearances between the adjacent ribs 54c of the upper stage section 54a of the holder 54 as shown in FIG. 6. At that time, the purge gas is heated by the heat (radiation heat) from the whole metal case 61. In contrast, the purge gas causes heat radiation from the whole metal case 61, thereby efficiently cooling the metal case 61. Thus, the purge pump 42 is cooled.

As described above, the purge gas cooled by desorption of vaporized fuel in the third-layer activated carbon 22-3 is heated by the heat radiating from the metal case 61 while being agitated by the impeller 53 of the purge pump 42. Thus, the purge gas is uniformly heated without temperature variation.

Since the flow path for purge gas is formed between the metal case 61 of the purge pump 42 and the canister case 21, this configuration can eliminate the need for a casing for the purge pump 42 and thus can cut the process of installing such a casing.

Subsequently, the purge gas flows in the third chamber 25-3 and then enters the second-layer activated carbon 22-2, causing the vaporized fuel adsorbed on the second-layer activated carbon 22-2 to desorb therefrom.

At that time, the purge gas heated in the third chamber 25-3 by the purge pump 42 flows in the second-layer activated carbon 22-2. Thus, the second-layer activated carbon 22-2 is heated by such a heated purge gas, which facilitates desorption of vaporized fuel from the second-layer activated carbon 22-2. Since this purge gas flowing in the second-layer activated carbon 22-2 has been heated without temperature variation as mentioned above, the vaporized fuel can be desorbed from the second-layer activated carbon 22-2 with high desorption efficiency.

After that, the purge gas flows from the second-layer activated carbon 22-2 to the second chamber 25-2, the first-layer activated carbon 22-1, and the first chamber 25-1 in turn and then flows out of the canister 2 through the purge port 23. In Example 1, the purge treatment is performed as described above.

Operations and Effects of Example 1

In the canister 2 in Example 1, the drive unit 51 of the purge pump 42 is placed in the third chamber 25-3 as described above.

Accordingly, when the purge pump 42 is driven to perform the purge treatment, the purge gas flowing through the third chamber 25-3 exchanges heat with the drive unit 51 of the purge pump 42. Thus, the purge gas flowing through the third chamber 25-3 is heated by the heat from the drive unit 51 of the purge pump 42, while the drive unit 51 of the purge pump 42 is cooled by the purge gas flowing through the third chamber 25-3. This operation can prompt desorption of vaporized fuel in the second-layer activated carbon 22-2 and enhance the cooling efficiency of the purge pump 42.

Specifically, while the purge gas cooled by desorption of vaporized fuel in the third-layer activated carbon 22-3 flows through the third chamber 25-3, this purge gas is heated by the heat from the metal case 61 of the drive unit 51 of the purge pump 42. The thus heated purge gas then flows in the second-layer activated carbon 22-2, heating this activated carbon 22-2. The vaporized fuel in the second-layer activated carbon 22-2 is accordingly prompted to desorb therefrom. Further, the purge gas cooled by desorption of vaporized fuel in the third-layer activated carbon 22-3 and flowing through the third chamber 25-3 cools the metal case 61 of the drive unit 51 of the purge pump 42. Thus, the cooling efficiency of the purge pump 42 can be enhanced.

Since the purge gas is entirely heated in the third chamber 25-3, the thus entirely heated purge gas facilitates heating of the whole second-layer activated carbon 22-2. Accordingly, the vaporized fuel in the second-layer activated carbon 22-2 is effectively prompted to desorb therefrom.

Since the metal case 61 with high heat conductivity is exposed to the purge gas, the metal case 61 and the purge gas efficiently exchange heat with each other.

In the canister 2 in Example 1, the whole purge pump 42 is placed in the third chamber 25-3. Thus, the canister 2 can provide a simple external structure and achieve an improved mounting ability on a vehicle.

The heatsink 52 of the purge pump 42 is placed in the third chamber 25-3.

Accordingly, when the purge pump 42 is driven to perform the purge treatment, the purge gas flowing through the third chamber 25-3 exchanges heat with the heatsink 52 of the purge pump 42. This heat exchange enables promotion of the desorption of vaporized fuel from the second-layer activated carbon 22-2 and enhancement of the cooling efficiency of the purge pump 42.

Figure 7:
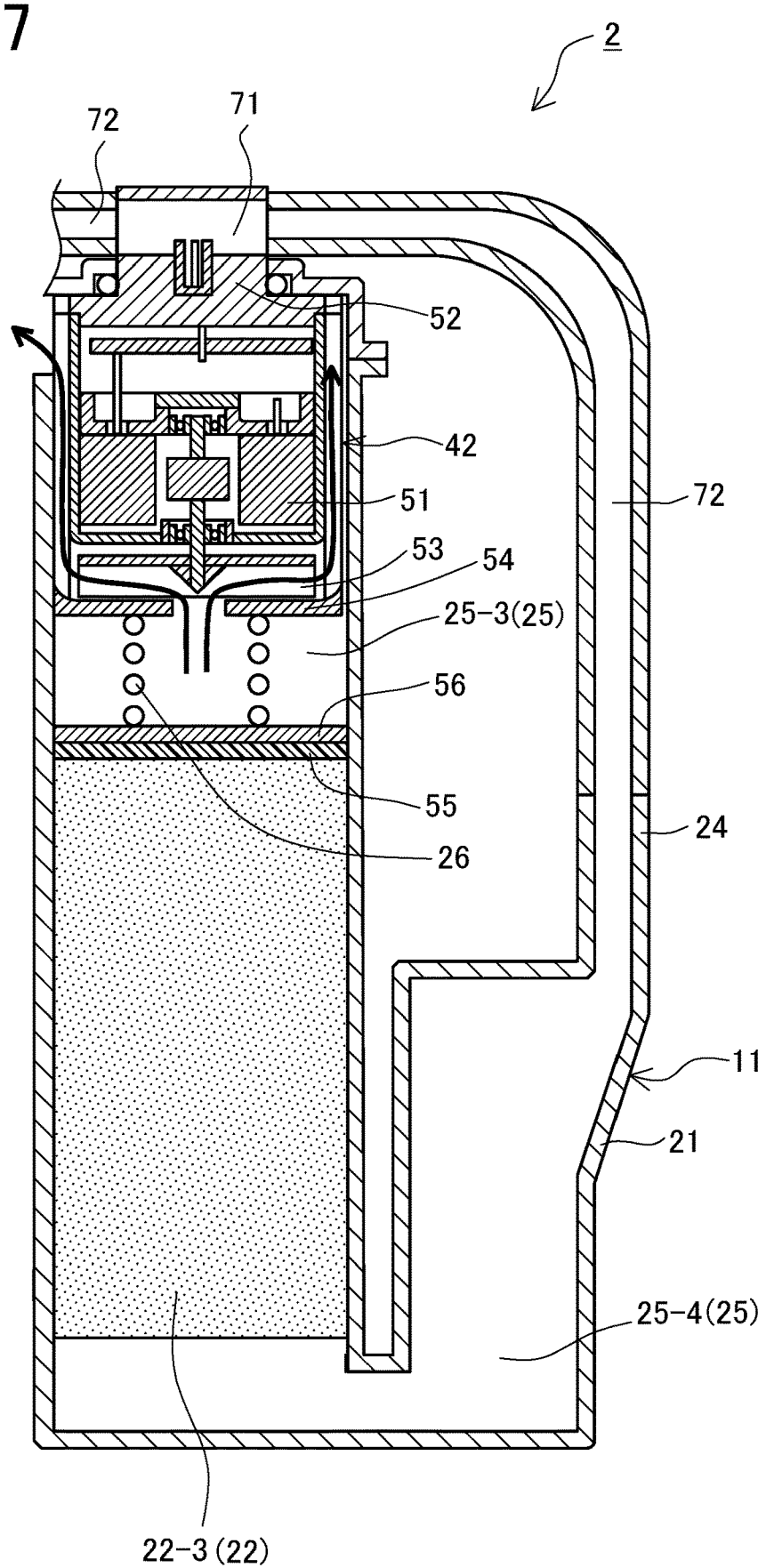
FIG. 7 is a cross-sectional view of a part of a canister in Example 2 of the second embodiment.
Figure 8:
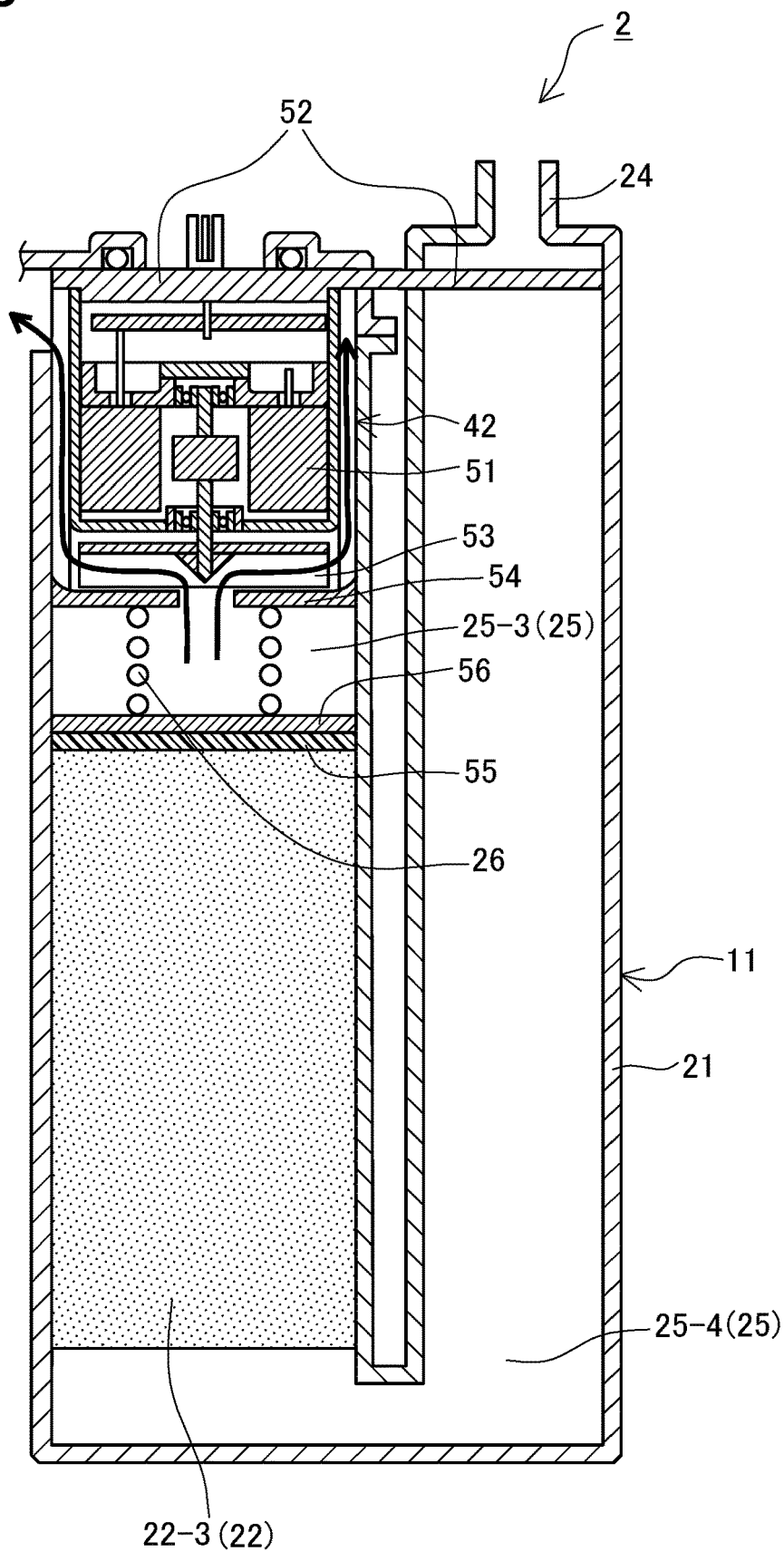
FIG. 8 is a cross-sectional view of a part of a canister in Example 3 of the second embodiment.
Figure 9:
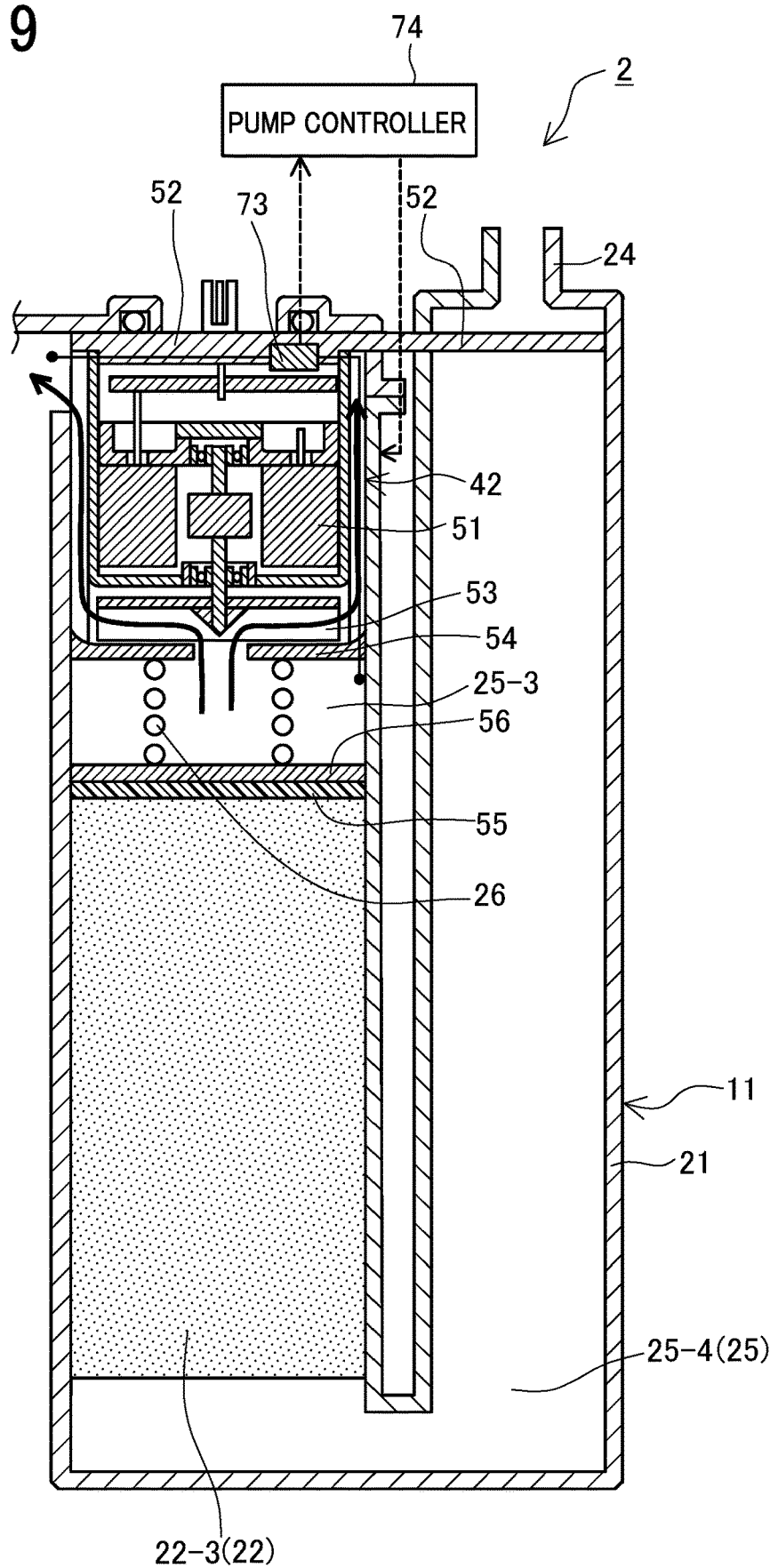
FIG. 9 is a cross-sectional view of a part of a canister in Example 4 of the second embodiment.

Next, Examples 2 to 4 of the second embodiment will be described with reference to FIGS. 7 to 12 with a focus on differences from Example 1. In FIGS. 7 to 9, showing a cross-sectional view of each canister in Examples 2 to 4, similar or identical parts to those in Example 1 (e.g., a left part in FIG. 4) are omitted.

EXAMPLE 2

In the canister 2 in Example 2, the heatsink 52 of the purge pump 42 includes an atmosphere passage 71 as shown in FIG. 7. This atmosphere passage 71 has one end communicating with the atmosphere and the other end communicating with the atmosphere port 24, through an atmosphere passage 72 of the canister body 11. The atmosphere passage 71 is one example of a heat-radiator atmosphere passage of the present disclosure. In Example 2, the purge pump 42 is supported with the urethane member 55, a support member 56, and a spring 26 with respect to the third-layer activated carbon 22-3. The urethane member 55 and the support member 56 are configured to allow purge gas to pass therethrough.

In Example 2, when the purge pump 42 is driven to perform the purge treatment, purge air is introduced from the atmosphere into the canister body 11 through the atmosphere passage 72, the atmosphere passage 71, and the atmosphere port 24. At that time, the purge air flowing through the atmosphere passage 71 exchanges heat with the heatsink 52 of the purge pump 42. Thus, the purge air flowing through the atmosphere passage 71 is heated by the heat from the heatsink 52 of the purge pump 42. The thus heated purge air passes through the atmosphere passage 72, the atmosphere port 24, and the fourth chamber 25-4 and then flows in the third-layer activated carbon 22-3, heating this activated carbon 22-3. This heating prompts desorption of the vaporized fuel in the third-layer activated carbon 22-3. Furthermore, the purge air flowing through the atmosphere passage 71 cools the heatsink 52 of the purge pump 42. Hence, the drive unit 51 of the purge pump 42 is also cooled through the heatsink 52. This cooling enhances the cooling efficiency of the purge pump 42. Consequently, the above configuration in Example 2 can prompt desorption of vaporized fuel in the third-layer activated carbon 22-3 and enhance the cooling efficiency of the purge pump 42.

In the canister 2 in Example 2, the heatsink 52 of the purge pump 42 is also placed outside the third chamber 25-3 and a part of the purge pump 42 is placed in the third chamber 25-3 between the second-layer activated carbon 22-2 and the third-layer activated carbon 22-3.

EXAMPLE 3

In the canister 2 in Example 3, as shown in FIG. 8, a part of the heatsink 52 of the purge pump 42 is placed in the fourth chamber 25-4 (located close to the air intake port) between the atmosphere port 24 and the third-layer activated carbon 22-3 located at a position closest to the atmosphere port 24.

Accordingly, when the purge pump 42 is driven to perform the purge treatment, the purge air flowing in the fourth chamber 25-4 exchanges heat with the heatsink 52 of the purge pump 42. Thus, the purge air flowing through the fourth chamber 25-4 is heated by the heat from the heatsink 52 of the purge pump 42. The thus heated purge air then enters the third-layer activated carbon 22-3, heating this activated carbon 22-3. This heating prompts the vaporized fuel to desorb from the third-layer activated carbon 22-3. Further, the purge air flowing in the fourth chamber 25-4 cools the heatsink 52 of the purge pump 42. Hence, the drive unit 51 of the purge pump 42 is also cooled through the heatsink 52. This cooling enhances the cooling efficiency of the purge pump 42. Consequently, the above configuration in Example 3 can prompt desorption of vaporized fuel in the third-layer activated carbon 22-3 and enhance the cooling efficiency of the purge pump 42.

EXAMPLE 4

The canister 2 in Example 4 includes a pressure sensor 73 and a pump controller 74 as shown in FIG. 9. The pressure sensor 73 is configured to detect a differential pressure between front and rear of the purge pump 42. The pump controller 74 is configured to calculate a vapor concentration from a detection result of the front-rear differential pressure between the front side and the rear side of the purge pump 42 detected by the pressure sensor 73 (i.e., a concentration of the vaporized fuel contained in the purge gas, or Purge A/F) and drive the purge pump 42, that is, control the number of rotations of the purge pump 42.

For example, the pump controller 74 is configured to control the number of rotations of the purge pump 42 as shown in FIG. 11 to regulate the purge flow rate, i.e., the flow rate of purge gas allowed to flow, according to the vapor concentration calculated as shown in FIG. 10. Specifically, as the vapor concentration gradually decreases with time as shown in FIG. 10, the pump controller 74 controls the number of rotations of the purge pump 42 to increase in a stepwise manner as shown in FIG. 11 to stepwise increase the purge flow rate.

As described above, when the vapor concentration is high, as shown in FIG. 12, the pump controller 74 adjusts the purge flow rate to a small flow rate for the purpose of preventing excessive cooling the activated carbon 22 due to desorption of vaporized fuel to improve the efficiency of desorption of vaporized fuel in the activated carbon 22, that is, promote the desorption. On the other hand, for the purpose of increasing the desorption amount of vaporized fuel in the activated carbon 22 by a large purge flow rate, the pump controller 74 regulates the purge flow rate to a large flow rate.

As described above, the canister 2 in Example 4 includes the pressure sensor 73 and the pump controller 74. Accordingly, the canister 2 can control driving of the purge pump 42 based on the vapor concentration to supply an appropriate flow rate of purge gas according to the vapor concentration. This configuration enables efficient desorption of vaporized fuel from the activated carbon 22.

Moreover, the canister 2 (the pump controller 74) can offer, or transmit, the information about the vapor concentration and the purge flow rate to an engine control system, so that this information can be controlled in coordination with the injection amount of fuel in an engine. This operation can contribute to emission gas purification.

The foregoing embodiments are mere examples and give no limitation to the present disclosure. The present disclosure may be embodied in other specific forms without departing from the essential characteristics thereof.

For instance, in the first embodiment, the heatsink 32 of the purge pump 12 may further be placed in the second chamber 25-2 in addition to the fourth chamber 25-4 as indicated with a dotted line in FIG. 1. As alternatives, the heatsink 32 of the purge pump 12 may be placed in the first chamber 25-1, the third chamber 25-3, or the fifth chamber 25-5.

The activated carbon 22 is not limited to the foregoing four or three layers of activated carbon exemplified above and has only to be provided in more than one layer. As the adsorbent, any materials other than activated carbon may be adopted.

In the second embodiment, the purge pump 42 may be placed in the first chamber 25-1, the second chamber 25-2, or the fourth chamber 25-4.

REFERENCE SIGNS LIST

1 Canister
2 Canister
11 Canister body
12 Purge pump
21 Canister case
22 Activated carbon
22-1 First-layer activated carbon
22-2 Second-layer activated carbon
22-3 Third-layer activated carbon
22-4 Fourth-layer activated carbon
24 Atmosphere port
25 Chamber
25-1 First chamber
25-2 Second chamber
25-3 Third chamber
25-4 Fourth chamber
25-5 Fifth chamber
31 Drive unit
32 Heatsink
33 Atmosphere passage
42 Purge pump
51 Drive unit
51 Heatsink
53 Impeller
54 Holder
54a Upper stage section
54b Lower stage section
54c Rib
54d Fin
54e Hole
61 Metal case
62 Motor
63 Bearing
64 Circuit
71 Atmosphere passage
73 Pressure sensor
74 Pump controller

What is claimed is:

1. A canister comprising:
a plurality of adsorbents for adsorbing vaporized fuel; and
a purge pump configured to introduce atmospheric air into the canister and cause a purge gas containing the vaporized fuel to flow out of the canister, wherein:
the purge pump includes a heat radiator placed in a chamber defined between the adsorbents,
the purge pump further includes a heat generator,
the heat radiator is provided separately from the heat generator, and
the heat radiator is placed in the chamber so as to be positioned with a clearance from the adsorbents so that the heat radiator is not in contact with the adsorbents.

2. The canister according to claim 1, further comprising an air intake port through which atmospheric air is introduced into the canister,
wherein the heat generator of the purge pump is provided with a heat-generator atmosphere passage communicating with atmosphere and the air intake port.

3. The canister according to claim 1, wherein the heat generator of the purge pump is placed in the chamber.

4. The canister according to claim 3, further comprising an air intake port through which atmospheric air is introduced into the canister,
wherein the heat radiator of the purge pump is provided with a heat radiator atmosphere passage communicating with atmosphere and the air intake port.

5. The canister according to claim 3, further comprising an air intake port through which atmospheric air is introduced into the canister,
wherein a part of the heat radiator of the purge pump is placed in an air-intake-port side chamber located between the air intake port and one of the adsorbents, the one adsorbent being located at a position closest to the air intake port.

6. The canister according to claim 3, further comprising:
a differential pressure detecting unit configured to detect a differential pressure between front and rear of the purge pump; and
a pump controller configured to control driving of the purge pump according to a concentration of the purge gas, the concentration being obtained from a detection result of the differential pressure detecting unit.

* * * * *